(12) United States Patent
Higashino et al.

(10) Patent No.: US 8,934,325 B2
(45) Date of Patent: Jan. 13, 2015

(54) INFORMATION RECORDING MEDIUM, INFORMATION REPRODUCING METHOD, AND INFORMATION REPRODUCING APPARATUS

(71) Applicant: Sony Corporation, Tokyo (JP)

(72) Inventors: Satoru Higashino, Tokyo (JP); Toshihiro Horigome, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/162,982

(22) Filed: Jan. 24, 2014

(65) Prior Publication Data
US 2014/0219073 A1   Aug. 7, 2014

(30) Foreign Application Priority Data

Feb. 1, 2013   (JP) .................................. 2013-018139

(51) Int. Cl.
*G11B 7/24* (2013.01)
*G11B 7/007* (2006.01)

(52) U.S. Cl.
CPC .................. *G11B 7/00745* (2013.01)

USPC ........................................ 369/275.3; 369/275.4

(58) Field of Classification Search
USPC ................. 369/275.1–275.5, 53.34, 277, 278
See application file for complete search history.

(56) References Cited

U.S. PATENT DOCUMENTS 7,075,883 B2 *   7/2006   Minamino et al. ......... 369/275.3
7,529,167 B2 *   5/2009   Minamino et al. ......... 369/53.34

FOREIGN PATENT DOCUMENTS

JP           2006-012348 A       1/2006

* cited by examiner

*Primary Examiner* — Ali Neyzari
(74) *Attorney, Agent, or Firm* — Wolf, Greenfield & Sacks, P.C.

(57) ABSTRACT

An information recording medium is provided with an information track formed thereon in a shape of concentric circles or in a spiral shape, wherein a continuously-wobbling groove in which information is recorded is formed in advance, the information is delimited by a predetermined number of wobble sections, a sync mark is placed in a plurality of wobble sections in the vicinity of a delimiter of the predetermined number of wobble sections, and the sync mark is spaced apart from data other than the sync mark at a distance.

10 Claims, 12 Drawing Sheets

FIG. 3

| ADIP UNIT NUMBER | ADIP UNIT TYPE | ADIP NIBBLE BIT NUMBER | ADIP CODE WORD NIBBLE NUMBER |
|---|---|---|---|
| 0 | MONOTONE | --- | --- |
| 1 | SYNC_0 | --- | |
| 2 | MONOTONE | --- | |
| 3 | SYNC_1 | --- | |
| 4 | MONOTONE | --- | |
| 5 | SYNC_2 | --- | |
| 6 | MONOTONE | --- | |
| 7 | SYNC_3 | --- | |
| 8 | REFERENCE | --- | |
| 9 | DATA_X | b3 | C0 |
| 10 | DATA_X | b2 | |
| 11 | DATA_X | b1 | |
| 12 | DATA_X | b0 | |
| 13 | REFERENCE | | --- |
| 14 | DATA_X | b3 | C1 |
| 15 | DATA_X | b2 | |
| 16 | DATA_X | b1 | |
| 17 | DATA_X | b0 | |
| 18 | REFERENCE | | |
| 78 | REFERENCE | | --- |
| 79 | DATA_X | b3 | C14 |
| 80 | DATA_X | b2 | |
| 81 | DATA_X | b1 | |
| 82 | DATA_X | b0 | |

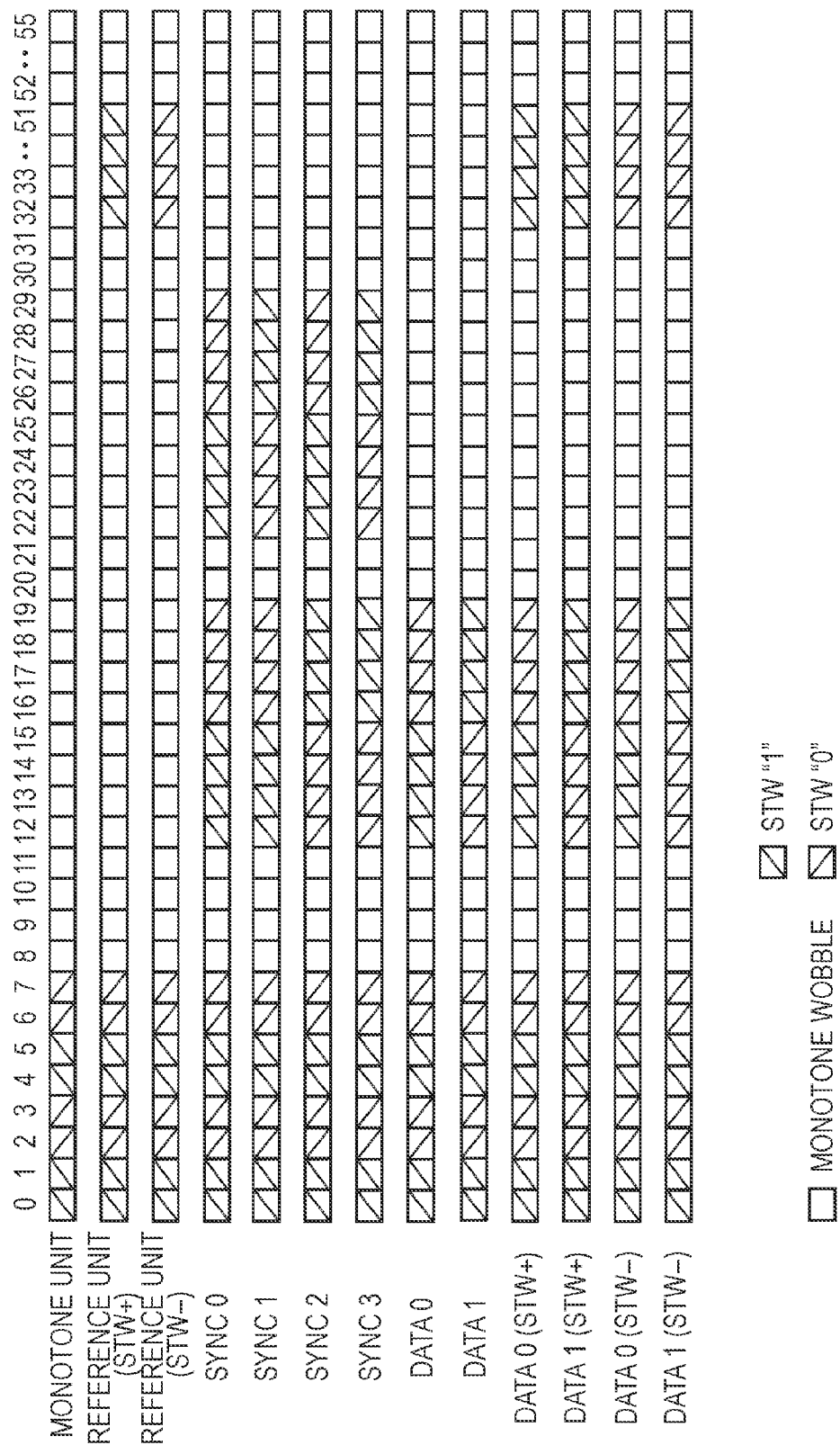

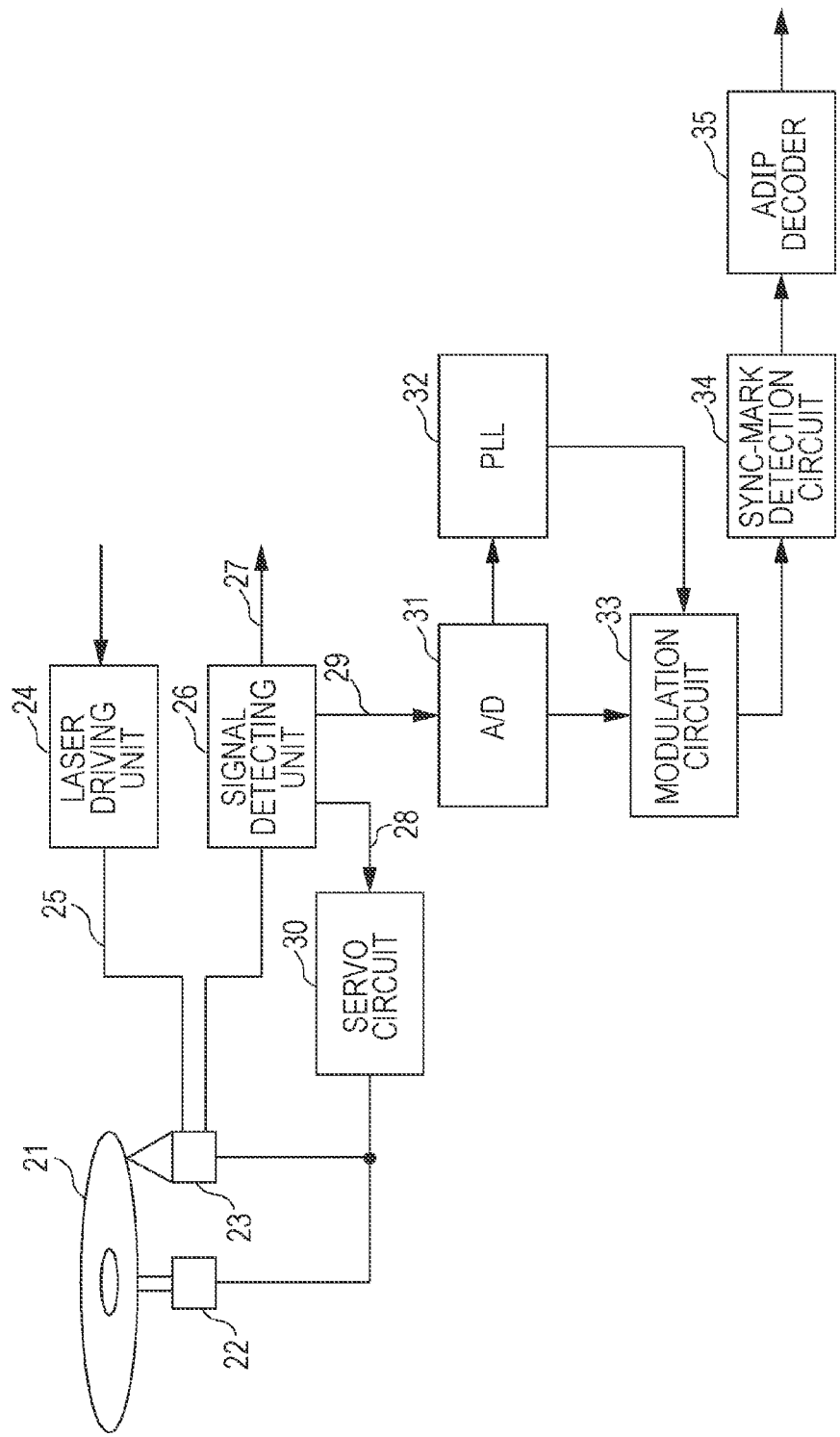

INFORMATION RECORDING MEDIUM, INFORMATION REPRODUCING METHOD, AND INFORMATION REPRODUCING APPARATUS

CROSS REFERENCE TO RELATED APPLICATIONS

This application claims the benefit of Japanese Priority Patent Application JP 2013-018139 filed Feb. 1, 2013, the entire contents of which are incorporated herein by reference.

BACKGROUND

The present disclosure relates to an information recording medium, which is adaptable to, for example, recordable optical discs, an information reproducing method, and an information reproducing apparatus.

Optical discs have been commercially used to record information or reproduce recorded information with the use of laser light. The optical discs can be classified into a read-only type, a write-once type, and a rewritable type. The write-once and rewritable optical discs have previously-recorded address information that is necessary to represent the position on the optical disc to record information.

There are two common methods for recording the address information. One of the methods is to record the address information in the form of preformatted pits. The other method is to modulate a signal, which is generated from a so-called wobble formed in a furrow, according to the address information. The preformatted pits recorded on an optical disc reduce the recordable area for user data, resulting in a reduction of the disc's storage capacity; however, the wobble method does not have such a problem. In general, the furrow is referred to as a "groove", and a track formed by the groove is referred to as a "groove track". In manufacture of the optical disc, the groove is defined as a portion that is irradiated with a laser beam, an area sandwiched between the adjacent grooves is referred to as a "land", and a track formed by the land is referred to as a "land track".

In a Blu-ray Disc (Registered Trademark) (BD) format, the address recorded as wobbles is referred to as an Address In Pre-groove (ADIP) word. In an ADIP word, a plurality of data units, called ADIP units, are arranged in a predetermined sequence. In an ADIP word, address information, auxiliary data, a reference region, an error correction code and so on are stored. A single ADIP unit expresses "0" or "1" of 1 bit, synchronization information, a reference unit, or a monotone unit. One wobble is equivalent to, for example, one period of a wobble fundamental wave ($\cos(2\pi ft)$).

A single ADIP unit includes 56 wobbles and a sync mark is placed in a section composed of a predetermined number of wobbles at the start of the ADIP unit. Since any type of the ADIP unit has a sync mark, detection of the sync mark detects the start of the ADIP unit. For example, Japanese Unexamined Patent Application Publication No. 2006-12348 describes a structure of ADIP data in a BD format and a method of demodulating the ADIP.

SUMMARY

Various disturbances, such as tilt and defocus, occur during address detection and degrade signal components, resulting in significant degradation of address detection performance. As used in related art, when address detection is made from a result of orthogonal integration by using a threshold, the signal component degradation decreases the address detection performance. Especially, if the sync mark is not properly detected, even adoption of an ECC (Error Correcting Code) mechanism into address detection could introduce difficulty in decoding the address.

In view of the above circumstances, the present disclosure provides an information recording medium, an information reproducing method, and an information reproducing apparatus, which are applied to, for example, detection of sync marks and can prevent the detection performance degradation caused by signal degradation.

For the purpose of solving the aforementioned problem, the present disclosure presents an information recording medium with an information track formed thereon in a shape of concentric circles or in a spiral shape. In the information recording medium, a continuously-wobbling groove in which information is recorded is formed in advance, the information is delimited by a predetermined number of wobble sections, a sync mark is placed in a plurality of wobble sections in the vicinity of a delimiter of the predetermined number of wobble sections, and the sync mark is spaced apart from data other than the sync mark at a distance.

The present disclosure presents an information reproducing method for reproducing information from an information recording medium with an information track formed thereon in a shape of concentric circles or in a spiral shape, wherein a continuously-wobbling groove in which information is recorded is formed in advance, the information is delimited by a predetermined number of wobble sections, and a sync mark is placed in a plurality of wobble sections in the vicinity of a delimiter of the predetermined number of wobble sections. The information reproducing method includes holding data in the plurality of wobble sections associated with the sync mark, determining a distance between a pattern of the held data and a pattern of the sync mark, and comparing the distance with a threshold to detect the sync mark.

The present disclosure presents an information reproducing apparatus for reproducing information from an information recording medium with an information track formed thereon in a shape of concentric circles or in a spiral shape, wherein a continuously-wobbling groove in which information is recorded is formed in advance, the information is delimited by a predetermined number of wobble sections, and a sync mark is placed in a plurality of wobble sections in the vicinity of a delimiter of the predetermined number of wobble sections. The information reproducing apparatus includes a holding unit that holds data in the plurality of wobble sections associated with the sync mark, a calculation unit that determines a distance between a pattern of the data held in the holding unit and a pattern of the sync mark, and a comparison unit that compares the distance with a threshold to detect the sync mark based on the comparison result obtained by the comparison unit.

According to the present disclosure, a desired signal, such as the sync mark of an address, can be reliably detected even if the signal has a poor SN ratio.

BRIEF DESCRIPTION OF THE DRAWINGS

FIG. 3 is a schematic diagram to illustrate the data structure of an ADIP word in the BD format;

FIG. 8 is a schematic diagram showing types of ADIP units used in the description of the first embodiment according to the present disclosure;

FIG. 9 is a block diagram of a reproducing apparatus according to the first embodiment of the present disclosure;

DETAILED DESCRIPTION OF EMBODIMENTS

Embodiments to be described below are suitable specific examples of the present disclosure, and have technically desirable limitations, but the scope of the present disclosure is not limited to the embodiments, if there is no mention that the present disclosure is limited, in the description below.

The present disclosure will be described below in the following order.

<1. BD Format>
<2. First Embodiment>
<3. Second Embodiment>
<4. Modification>
<1. BD Format>

The present disclosure can be applied to a format of address information in conformity with the BD (Blu-ray Disc (registered trademark)) format. Therefore, a large part of technology used in commercially available BDs, which are high-density optical discs, can be utilized. Firstly, address information in a BD format will be described prior to the description of present disclosure.

Figure 1:
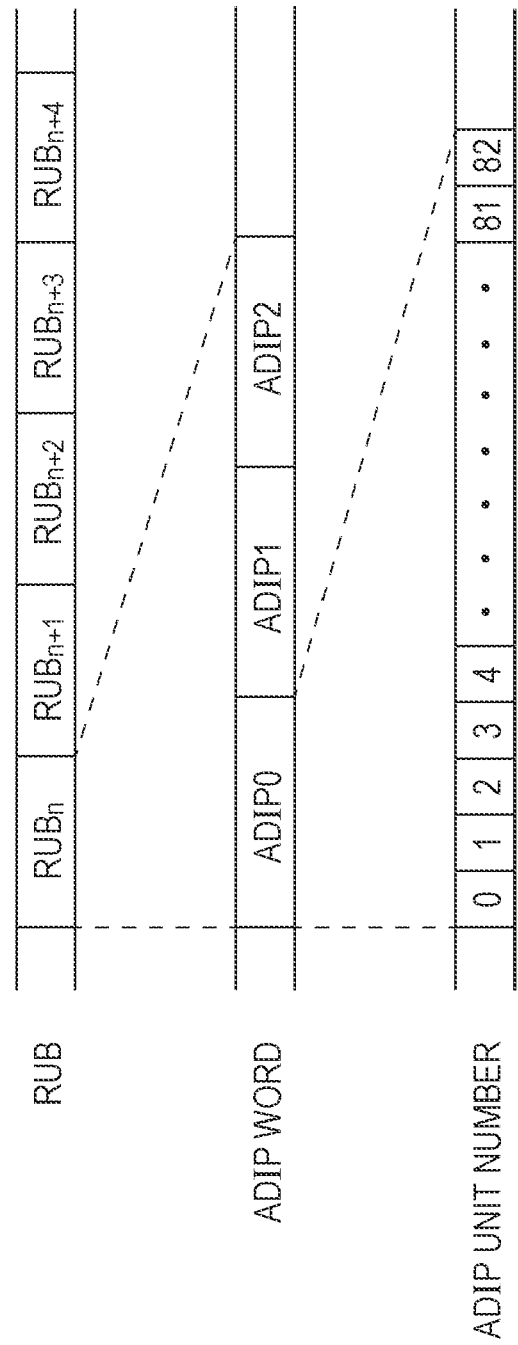
FIG. 1 is a schematic diagram to illustrate address data in a BD format.

As shown in FIG. 1, main data to be written is a sequence of Recording Unit Blocks (RUB) ($RUB_{n+0}$, $RUB_{n+1}$, $RUB_{n+2}$, $RUB_{n+3}$, ... ). The RUB is a unit for recording the main data (record/reproduction data) and has a predetermined length, for example, 64 Kbytes. Three ADIP (Address In Pre-groove) words, ADIP0, ADIP1, and ADIP2, are assigned to each RUB. The ADIP0, ADIP1, and ADIP2 have the same address information as one another.

In addition, a single ADIP word includes 83 ADIP units (unit number 0 to 82). In the single ADIP word, 24-bit address information, 12-bit auxiliary data, a reference region, an error correction code and so on are stored. These pieces of information are expressed by using, for example, 60 ADIP units out of the 83 ADIP units.

Figure 2:
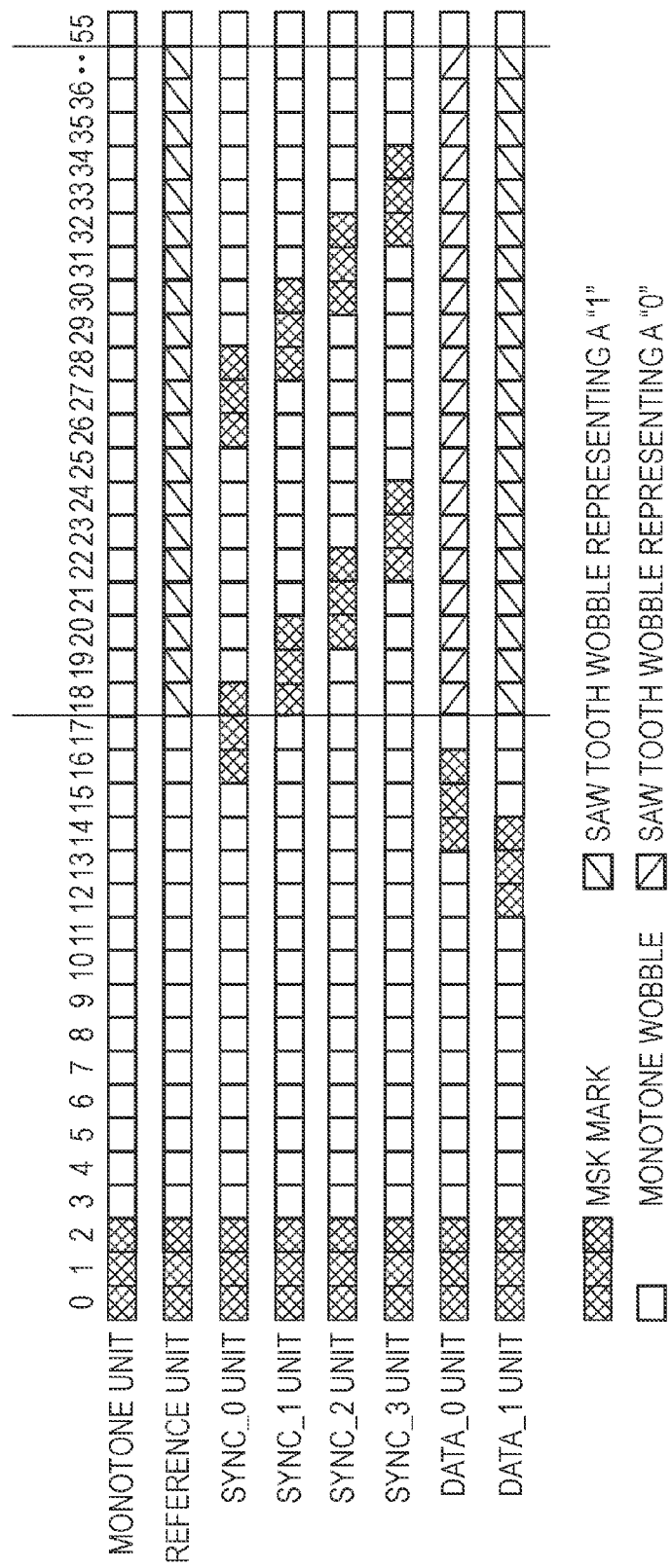
FIG. 2 is a schematic diagram to illustrate ADIP units in the BD format.

As shown in FIG. 2, a group of 56 wobble sections in total is defined as one ADIP unit that expresses "0" or "1" of one bit, synchronization information, a reference unit, or a monotone unit. One wobble is equivalent to, for example, one period of a wobble fundamental wave ($\cos(2\pi ft)$). Therefore, one ADIP word includes (83×56) wobble sections. FIG. 2 shows eight types of ADIP units (a monotone unit, a reference unit, four types of sync units, and two types of data units expressing "0" and "1" of the data, respectively). FIG. 2 shows only about 35 wobble sections per a group under the spatial constraint.

When the 56 wobble sections of the respective ADIP units are numbered from 0 to 55 to distinguish from one another as shown in FIG. 2, the sections with wobble numbers from 0 to 2, for example, are modulated by MSK (Minimum Shift Keying) and the sections with wobble numbers from 18 to 54 of the reference unit and data units are modulated by STW (Saw Tooth Wobble). Monotone wobbles are non-modulated wobble fundamental waves wobbling at a predetermined frequency ($\cos(2\pi ft)$).

An ADIP word has a data structure as shown in FIG. 3. The "ADIP unit type" in FIG. 3 corresponds to the types of ADIP units in FIG. 2. One ADIP word contains 60-bit data.

Figure 4:
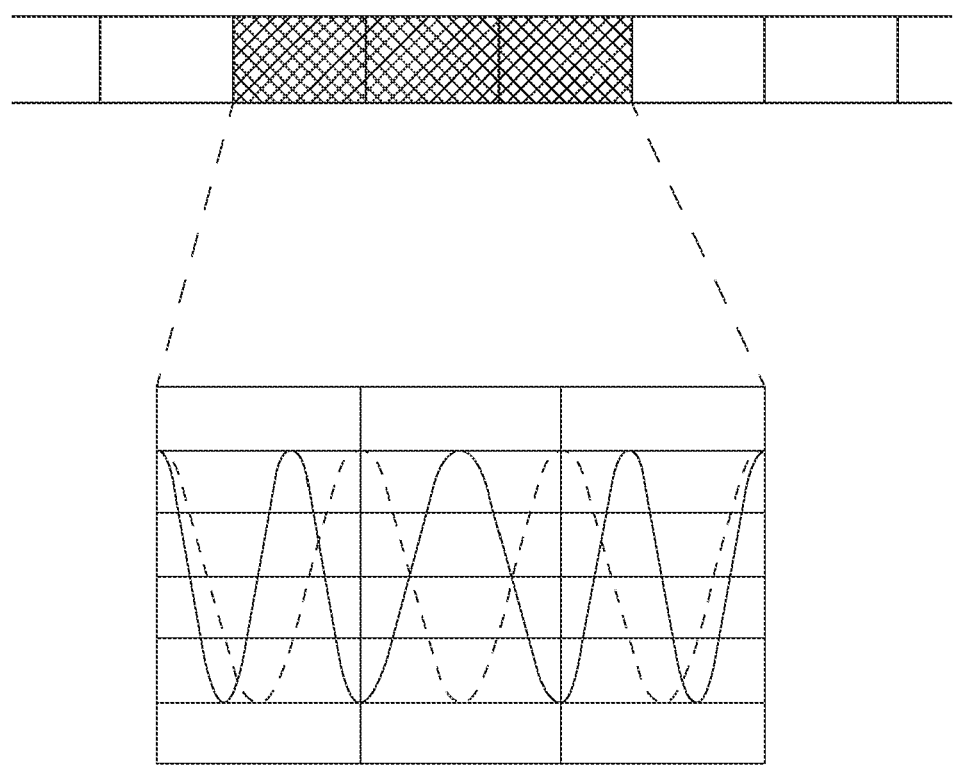
FIG. 4 is a waveform diagram to illustrate an MSK modulated waveform.

An MSK modulated waveform (appropriately referred to as an MSK mark) is formed across three wobble sections sandwiched between monotone wobbles as shown in FIG. 4. Specifically, the wobble sections are represented as $\cos(1.5\omega t)$, $-\cos(\omega t)$, and $-\cos(1.5\omega t)$, respectively. The frequency of the wobble sections in front and after the middle wobble section is set to 1.5 times that of the wobble fundamental wave, and therefore the waveform of the middle wobble section is inverted in polarity with respect to the parts that are not modulated by MSK. The MSK mark is placed at the start of each ADIP unit (wobble numbers from 0 to 2) and is used as a sync mark to detect the start position of the ADIP unit.

Furthermore, as shown in FIG. 2, the MSK mark is placed in wobble sections with numbers from 14 to 16 from the start of a data_0 ADIP unit, while the MSK mark is placed in wobble sections with numbers from 12 to 14 from the start of a data_1 ADIP unit. Thus, the difference in the position of the MSK represents 0 or 1 of data.

In the data_0 ADIP unit, the MSK represents 0 and an STW representing 0 is placed in wobble sections with numbers from 18 to 55. In the data_1 ADIP unit, the MSK represents 1 and an STW representing 1 is placed in wobble sections with numbers from 18 to 55.

An STW modulation technique is to generate a modulated waveform like teeth of a saw by adding or subtracting a second harmonic ($\sin(2\pi ft)$) to/from a wobble fundamental wave ($\cos(2\pi ft)$). The amplitude of the second harmonic is set to be as small as about one-fourth of the wobble fundamental wave. Either addition or subtraction is chosen according to "0" or "1" of data, thereby obtaining different modulated waveforms. The "0" or "1" is repeatedly recorded in the wobble sections with wobble numbers 18 to 54 of the reference unit and the data units.

A reason for using the two types of techniques as described above is to compensate for disadvantages of the respective techniques. In the MSK technique, one bit is recorded by modulating the first three wobbles of an ADIP unit. Thus, it is possible to use the wobbles as a reference for determining a position of data at the time of reproduction. On the other hand, in the STW technique, data is repeatedly recorded over a wide range as a very small waveform change. At the time of reproduction, a reproduced signal is integrated to discriminate between "0" and "1". Therefore, it is difficult to use the reproduced signal as information for detecting delimiters of data. However, the MSK technique, which is a local recording method, is susceptible to defects, such as scratches and dust, on a disk. The STW technique has an advantage that the system is less susceptible to such defects because data is recorded over a longer period.

Figure 5:
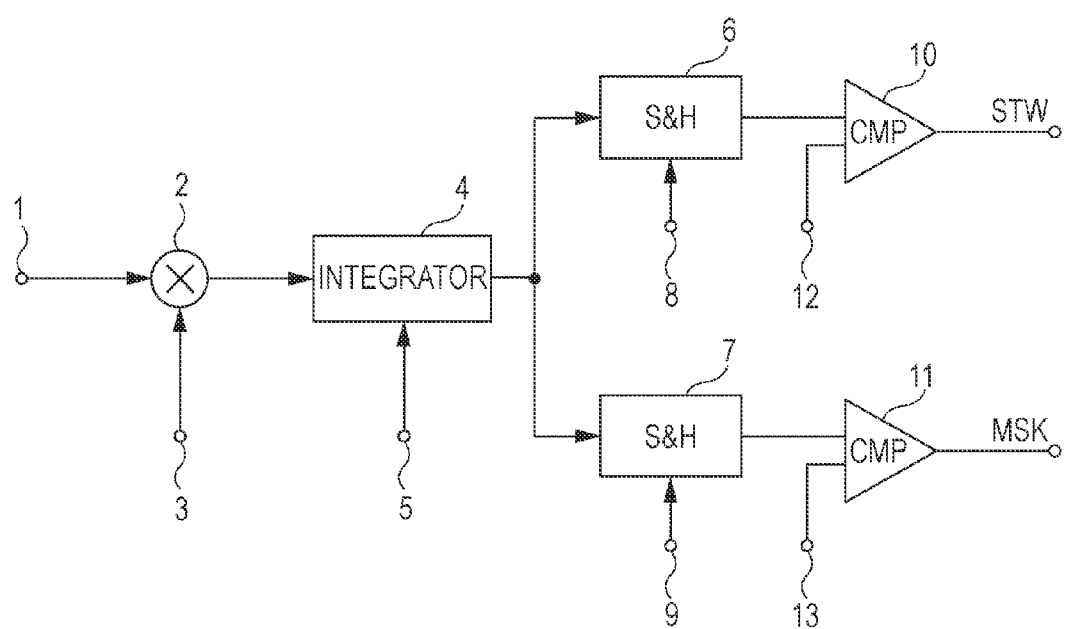
FIG. 5 is a block diagram of an exemplary demodulation circuit used in the past.

A demodulation circuit used in the past is configured as shown in FIG. 5. A wobble signal reproduced from a disc is supplied to an input terminal 1. A multiplier 2 multiplies the wobble signal by a carrier signal fed from an input terminal 3. The carrier signal is in synchronization with the reproduced signal, and therefore the multiplier 2 multiplies the wobble signal by a carrier signal with the same frequency as the reproduced signal at the time of MSK demodulation, while multiplying by a carrier signal with a frequency twice the reproduced signal at the time of STW demodulation.

The output signal from the multiplier 2 is supplied to an integrator 4. A reset signal is input to the integrator 4 from a terminal 5 to reset the integrator 4, thereby resetting the values accumulated in the integrator 4 to a default value, for example, zero. The output signal from the integrator 4 is supplied to sample-and-hold circuits 6 and 7.

Terminals 8, 9 feed sampling pulses to the sample-and-hold circuits 6, 7, respectively. With the sampling pulses, wobble signals are sampled and held in respective sections of MSK and STW. The output signals from the sample-and-hold circuits 6, 7 are supplied to comparators 10 and 11, respectively.

A terminal 12 supplies a reference level to the comparator 10, while a terminal 13 supplies a reference level to the comparator 11. The reference levels are center values of the wobble signals output from the sample-and-hold circuits 6 and 7, respectively. The comparators 10, 11 generate an output value of +1 when the input signal is greater than the reference level, whereas the comparators 10, 11 generate an output value of −1 when the input signal is smaller than the reference level. The comparator 10 provides an STW demodulation output, and the comparator 11 provides an MSK demodulation output. In the case of the MSK marks in the three wobble sections as shown in FIG. 4, an output of −1 is detected in the middle wobble section and the subsequent wobble section.

Figure 6A:
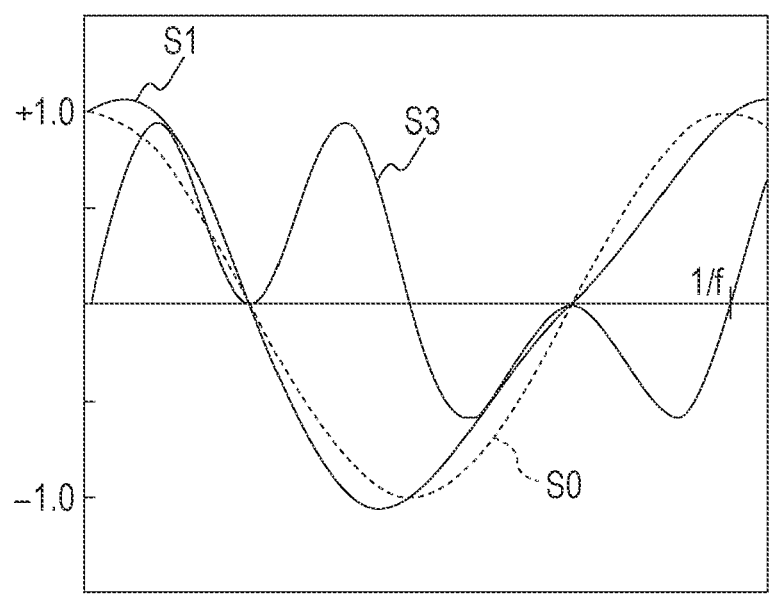
FIGS. 6A and 6B are waveform diagrams to illustrate an STW modulation method.
Figure 6B:
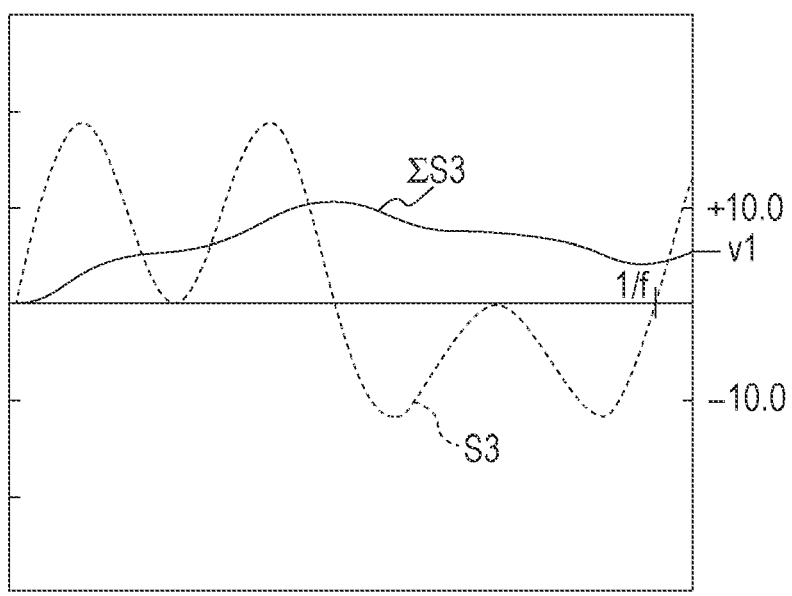
Figure 7A:
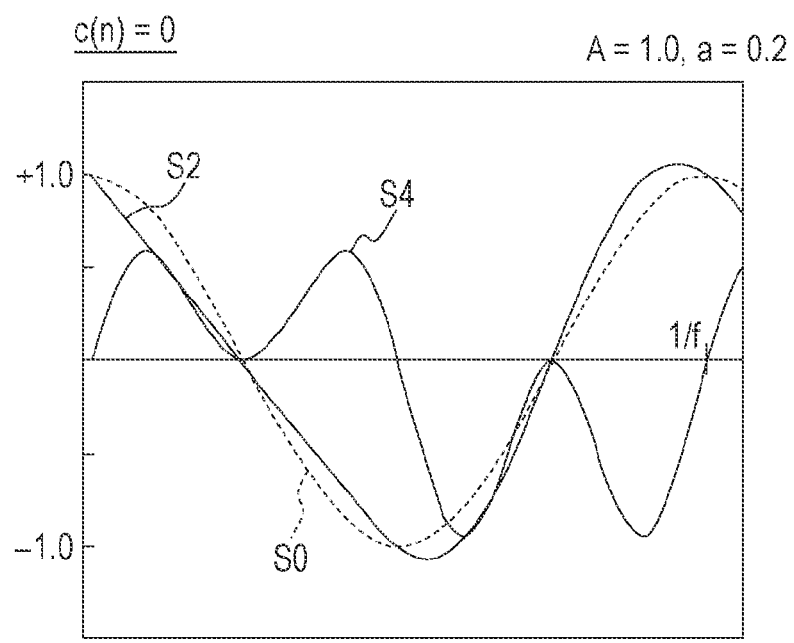
FIGS. 7A and 7B are waveform diagrams to illustrate the STW modulation method.

With reference to FIGS. 6A, 6B, 7A, and 7B, a detailed description will be given about a wobble signal modulated by the STW technique. In FIGS. 6A, 6B, 7A, and 7B, the horizontal axis represents time to show one period of a wobble fundamental wave (i.e., one wobble section), while the vertical axis represents normalized amplitude. FIG. 6A shows waveforms when data c(n) is "1", and FIG. 7A shows waveforms when the data c(n) is "0".

The dashed lines in FIGS. 6A and 7A indicate wobble fundamental waves S0 (=cos(2πft)). When c(n)="1", a sin signal with a frequency twice that of the wobble fundamental wave S0 is added to the wobble fundamental wave S0 to form a modulated waveform S1. This is expressed by: S1=A cos (2πft)+a sin(2π2ft), where A>a, for example, A=1 and a=0.2. This modulated wobble waveform S1 rises in the time direction (toward the outside of a disc along the radius direction of the disc) moderately relative to the wobble fundamental wave S0, and falls (toward the inside of the disc along the radius direction of the disc) steeply relative to the wobble fundamental wave S0.

As shown in FIG. 7A, when c(n)="0", a sin signal with a frequency twice that of the wobble fundamental wave S0 is subtracted from the wobble fundamental wave S0 to form a modulated waveform S2. This is expressed by: S2=A cos (2πft)−a sin(2π2ft). This modulated wobble waveform S2 rises in the time direction (toward the outside of a disc along the radius direction of the disc) steeply relative to the wobble fundamental wave S0, and falls (toward the inside of the disc along the radius direction of the disc) moderately relative to the wobble fundamental wave S0. Both the modulated wobble waveforms S1 and S2 have a phase identical with that of the wobble fundamental wave at a zero crossing point, thereby enabling easy extraction of clocks on a demodulation side.

Waveforms S3 and S4 shown in FIGS. 6A and 7A are waveforms used in demodulation processing (see FIG. 5) and obtained by respectively multiplying the reproduced modulated wobble signal by a sin signal (sin(2π2ft)) with a frequency twice that of the wobble fundamental wave.

Specifically, the waveform S3 is obtained by the reproduced modulated wobble waveform S1×sin(2π2ft), while the waveform S4 is obtained by the reproduced modulated wobble waveform S2×sin(2π2ft).

Figure 7B:
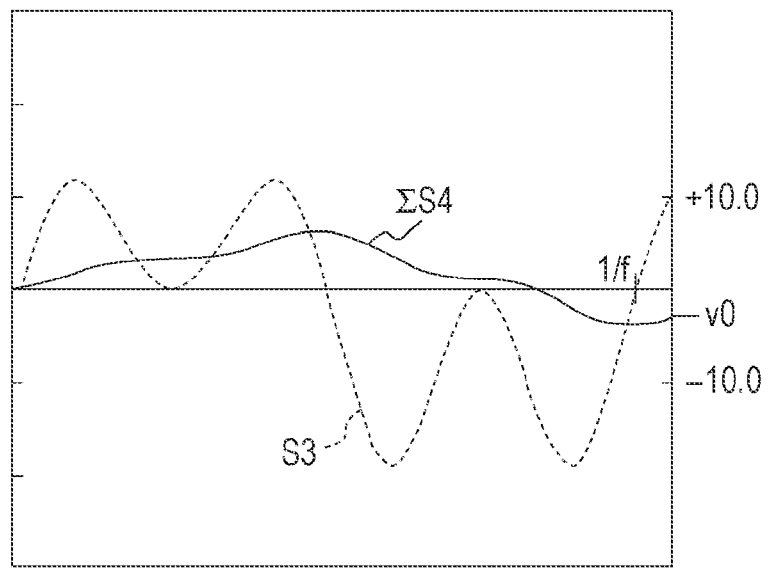

On the demodulation side, as shown in each of FIGS. 6B and 7B, the waveforms S3 and S4 across one wobble section are subjected to integration (summation), respectively, to obtain integral values ΣS3 and ΣS4. The integral value ΣS3 at the end point of one wobble section results in a positive value v1. On the other hand, the integral value ΣS4 at the end point of one wobble section results in a negative value v0. The integral values are compared with the reference level, which is the center of the wobble signal, and treated, for example, as v1=+1, v0=−1.

Since one bit of data is represented by fifty six wobbles, if all the wobbles are +1, +56 is obtained as an integration result of the fifty six wobbles. If all the wobbles are −1, −56 is obtained as an integration result of the fifty six wobbles. A reproduced chip sequence obtained as integral values of the respective wobbles is multiplied by a code sequence, which is identical to a code sequence used for recording. On the basis of a result obtained by integrating the multiplication results for the fifty six wobbles, one bit (1/0) (0 and 1 denote logical values) of data is determined.

<2. First Embodiment>
ADIP Unit Structure

In the first embodiment according to the present disclosure, the structure of the ADIP unit in the aforementioned BD format is altered as shown in FIG. 8 to further enhance detection performance against degraded signals. Similar to the ADIP word in the BD format, the altered ADIP word is composed of 83 ADIP units, each of the ADIP units including 56 wobbles. The respective ADIP words contain address information, an error correction code, and so on. Each of the ADIP words includes (56×83) wobble sections.

As described above, there are eight types of ADIP units in the BD format as shown in FIG. 2. The first embodiment according to the present disclosure prescribes twelve types of ADIP units as shown in FIG. 8, and adopts only the STW modulation technique.

Fifty six wobble sections in a single ADIP unit are prescribed as follows.

Wobble numbers 0 to 7: sync mark
Wobble numbers 12 to 19: data mark A
Wobble numbers 22 to 29: data mark B The sync mark is assigned to all ADIP units as common data. Specifically, STW representing 1 is placed in wobbles with wobble numbers 0, 1, 4, 5, and STW representing 0 is placed in wobbles with wobble numbers 2, 3, 6, 7.

The monotone unit contains data of a non-modulated wobble fundamental wave (monotone) in addition to the sync mark.

The reference units STW+ and STW− respectively have the following data structure in addition to the sync mark.

Reference unit STW+: STWs representing 1 are placed to wobble numbers 32 to 51.
Reference unit STW−: STWs representing 0 are placed to wobble numbers 32 to 51.

The sync units 0 to 3 are distinguishable by the structure of data mark A and data mark B.

Data 0 unit and data 1 unit are prescribed by STW placed at data mark A in addition to the sync mark as shown below.

Data 0 unit: STWs representing 1 are placed to wobble numbers 12 to 15, and STWs representing 0 are placed to wobble numbers 16 to 19.

Data 1 unit: STWs representing 0 are placed to wobble numbers 12 to 15, and STWs representing 1 are placed to wobble numbers 16 to 19.

When data is recorded in only a groove as has been done on media in a BD format in the past, address information is recorded with the aforementioned data. When data is also recorded in a land in addition to the groove in order to increase recording density, address information is recorded with data with out-of-phase STWs to enable reproduction of addresses on the land. Specifically, a data 0 (STW+) unit with STWs representing 1 placed to wobble numbers 32 to 51 and a data 0 (STW−) unit with STWs representing 0 placed to wobble numbers 32 to 51 are prescribed as data 0 units. Also, a data 1 (STW+) unit with STWs representing 1 placed to wobble numbers 32 to 51 and a data 1 (STW-) unit with STWs representing 0 placed to wobble numbers 32 to 51 are prescribed as data 1 units. Irrespective of the presence or absence of STWs in the area from wobble numbers 32 to 51, the data 0 units and data 1 units have common STW data, respectively, in the data mark A.

Disc Playback Apparatus

A disc playback apparatus according to the first embodiment of the present disclosure will be described by mainly focusing on address reproduction. As shown in FIG. 9, data is recorded in an optical disc 21 and reproduced from the optical disc 21.

The optical disk 21 is rotated by a spindle motor 22. When data is recorded in both the land and groove, the optical disc 21 is rotated at a constant angular velocity because it is desirable that the wobbles of adjacent tracks are in phase. Specifically, the optical disc 21 is rotated by a CAV method or a zone CAV method. A driving signal from a laser driving unit 24 is supplied to an optical head 23. A laser beam with intensity modulated according to recording data 25 is applied onto the optical disc 21 from the optical head 23. Data is recorded at a predetermined position of the optical disc 21. The position in which the data is recorded is determined on the basis of address information reproduced.

A reading laser beam is applied from the optical head 23 onto the optical disc 21, and is reflected. The reflected light is detected by a photodetector in the optical head 23 and is then detected by a signal detecting unit 26 as a reproduced signal. The signal detecting unit 26 extracts a reproduced signal 27, a servo-error signal 28 such as a focus error signal or a tracking error signal, and a wobble signal 29. The wobble signal 29 is an output signal from a detector with a photo-detecting element that is separated into two sections along a track direction. For example, the sum of signals from the two sections of the detector is extracted as a wobble signal 29. The wobble signal 29 corresponds to a wobble waveform.

The servo-error signal 28 is supplied to a servo circuit 30. Rotation of the spindle motor 22 is controlled by the servo circuit 30 at a constant angular velocity. Focus and tracking of the optical head 23 are also controlled by the servo circuit 30.

The wobble signal 29 detected by the signal detecting unit 26 is supplied to an A/D converter 31 and converted into a digital signal by the A/D converter 31. The output signal of the A/D converter 31 is supplied to a digital PLL (Phase Locked Loop) 32 and a demodulation circuit 33. The PLL 32 outputs a clock in synchronization with the reproduced signal. The clock is used as a reference of timing during reproduction processing. The clock is supplied from the PLL 32 to the demodulation circuit 33.

The demodulation circuit 33 demodulates STW signals. The demodulated STW signal is supplied to a sync-mark detection circuit 34. The sync-mark detection circuit 34 detects the top sync mark of each ADIP unit. The detection signal of the sync mark and the data are supplied to an ADIP decoder 35. The ADIP decoder 35 decodes address data and other types of data recorded in every ADIP word and performs error correction.

As described above, the demodulation circuit 33 multiplies the reproduced STW signal (wobble signal) by a sin signal ($\sin(2\pi 2ft)$) with a frequency twice that of the wobble fundamental wave. The multiplication result is integrated within one wobble section. The integration result of the STW signal when data is 1 is +1, the integration result of the STW signal when data is 0 is −1, and the integration result of the monotone signal is 0. The sync-mark detection circuit 34 determines by calculations a metric between a pattern of eight continuous values of the reproduced STW signal and a pattern of existing sync marks. If the determined metric is equal to a predetermined value or lower, the sync-mark detection circuit 34 determines that the reproduced STW signal is a sync mark. The term "metric" denotes "Euclidean distance". Since the Euclidean distance is a square root of the sum of the squares of the difference between two values and the circuits and software to compute the square root are complex, a square distance of the sum of squares of the difference is used as a metric in the present disclosure.

Figure 10A:
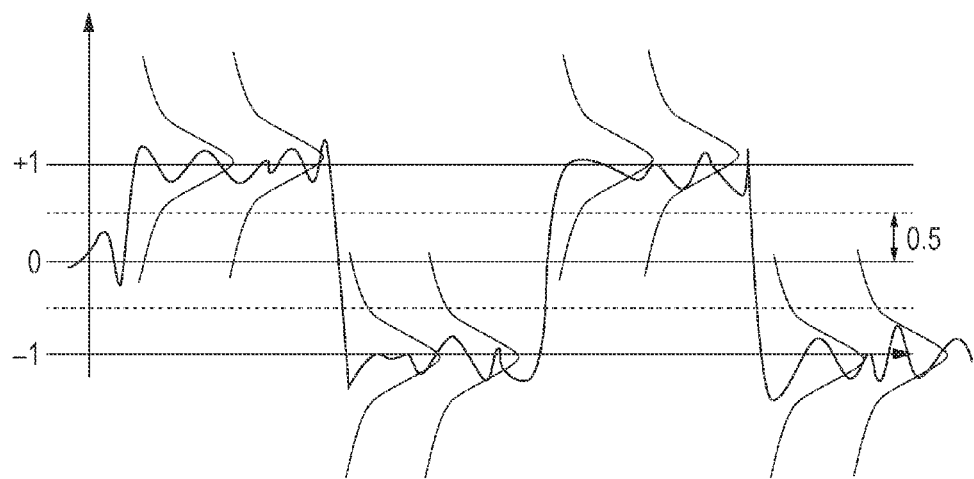
FIGS. 10A and 10B are schematic diagrams to illustrate the first embodiment of the present disclosure.

In the data structure of the ADIP units shown in FIG. 8, the sync marks are represented as {+1, +1, −1, −1, +1, +1, −1, −1}. FIG. 10A schematically shows the behavior of a sync mark with noise superimposed thereon. FIG. 10A also shows the variance of noise. In a related sync-mark detection method, sync marks are detected by discriminating between +1 and −1 with respect to the center value 0. Specifically, values beyond +0.5 are determined to be +1 and values below −0.5 are determined to be −1.

On the other hand, the pattern of the sync marks in the first embodiment according to the present disclosure is at least a minimum distance of 8 away from the other pattern. The metric is calculated by an equation as shown below. If the result is smaller than (8/2=4), it is determined to be a sync mark.

$$L_{sync}=(y_0-1)^2+(y_1-1)^2+(y_2-(-1))^2+(y_3-(-1))^2+\\(y_4-1)^2+(y_5-1)^2+(y_6-(-1))^2+(y_7-(-1))^2<8/2=4$$

For example, a monotone composed of a wobble fundamental wave is represented as {0, 0, 0, 0, 0, 0, 0, 0}. Therefore, the square distance between the monotone and sync mark is 8. This square distance is the minimum.

Figure 10B:
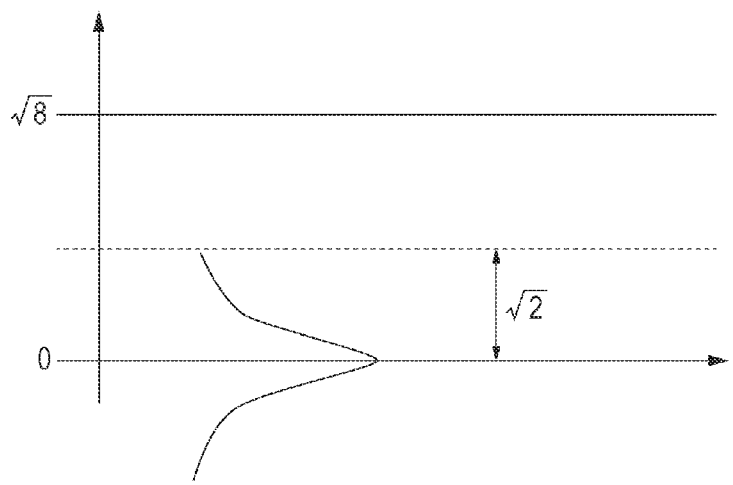

In a related detection method, the sync marks are determined based on the variance of noise with respect to a threshold of 0.5. In the first embodiment according to the present disclosure, the metric is calculated and then the sync mark is determined based on the variance of noise with respect to ($\sqrt{8}/2=\sqrt{2}$) as shown in FIG. 10B. Therefore, the detection method of the first embodiment is more robust to noise than the related one by $\sqrt{2}/0.5=2\sqrt{2}$=approximately 9 dB. In addition, the first embodiment employing only the STW modulation technique has an advantage over cases employing the MSK technique involving frequency variations because there are no difficulties in locking in the frequency by the PLL.

As described above, processing to detect a data mark is performed after detection of the sync mark. The sync mark could be compared with all patterns of the eight wobble sections; however, since detection of the data mark is performed after detection of the sync mark, the wobble number of the data mark in the ADIP unit is already identified. Specifically, in the first embodiment, data mark A and data mark B are detected in wobble numbers 12 to 19 and wobble numbers 22 to 29, respectively. During detection of the data mark, the minimum square distance of 8 is ensured between the data marks. The threshold in this case is (8/2=4), and the data mark can be detected by the following equations.

$$L_{data0}=(y_0-1)^2+(y_1-1)^2+(y_2-1)^2+(y_3-1)^2+(y_4-(-1))^2+(y_5-(-1))^2+(y_6-(-1))^2+(y_7-(-1))^2<8/2=4$$

$$L_{data1}=(y_0-(-1))^2+(y_1-(-1))^2+(y_2-(-1))^2+(y_3-(-1))^2+(y_4-1)^2+(y_5-1)^2+(y_6-1)^2+(y_7-1)^2<8/2=4$$

If $L_{data0}$ of the above equation is detected, the data mark is determined to be data 0. If $L_{data0}$ is not detected, it is determined whether $L_{data1}$ of the above equation is detected, and if $L_{data1}$ is detected, the data mark is determined to be data 1. If both $L_{data0}$ and $L_{data1}$ are not detected, it is determined to be a wobble fundamental wave.

<3. Second Embodiment>
ADIP Unit Structure

Figure 11:
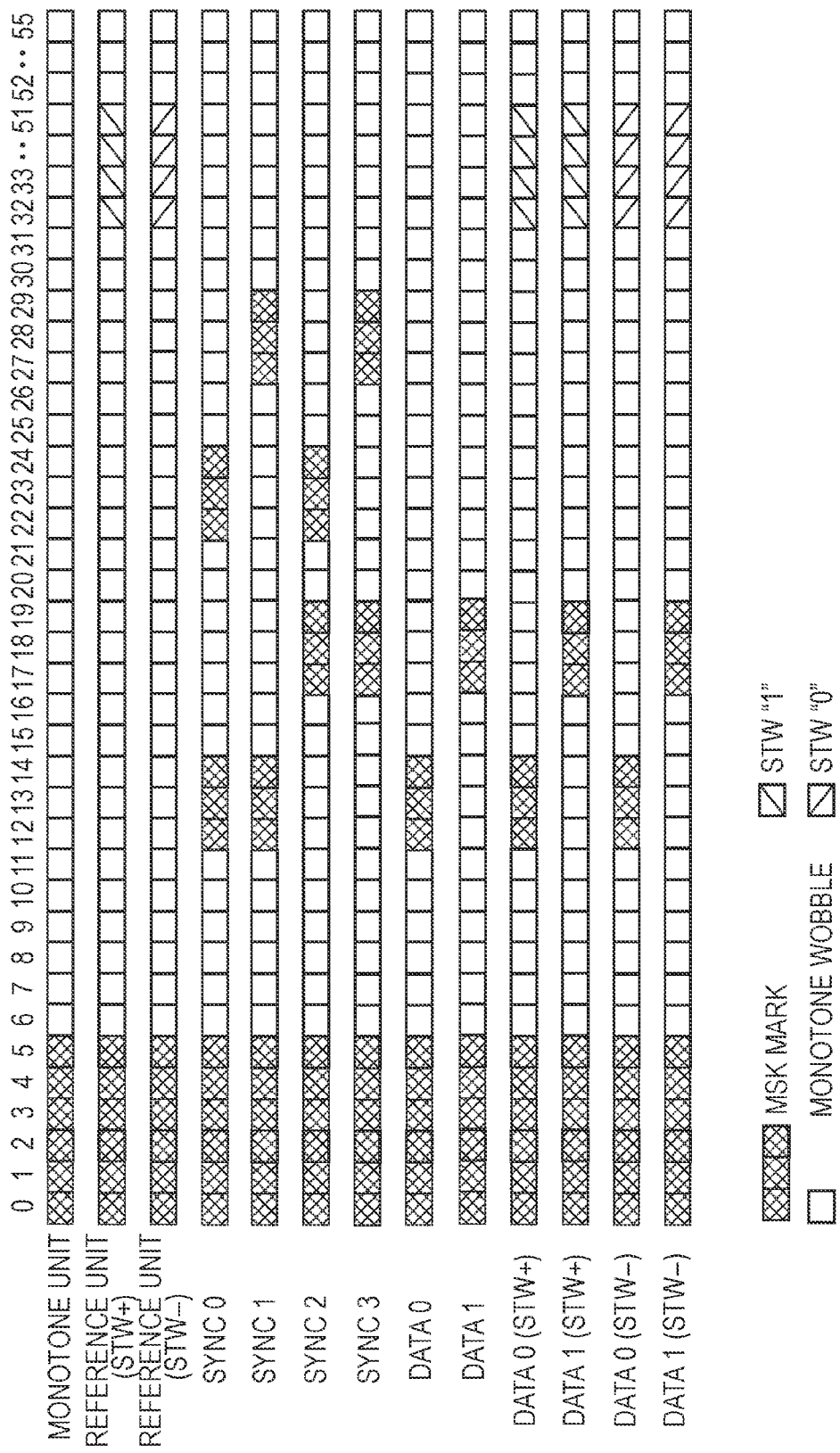
FIG. 11 is a schematic diagram showing types of ADIP units used in the description of the second embodiment according to the present disclosure.

In the second embodiment according to the present disclosure, the structure of the ADIP unit in the aforementioned BD format is altered as shown in FIG. 11 to further enhance detection performance against degraded signals. Similar to the ADIP word in the BD format, the altered ADIP word is composed of 83 ADIP units, each of the ADIP units including 56 wobble sections. The respective ADIP words contain address information, an error correction code, and so on. Each of the ADIP words includes (56×83) wobble sections.

As described above, there are eight types of ADIP units in the BD format as shown in FIG. 2. As with the case of the first embodiment, the second embodiment according to the present disclosure prescribes twelve types of ADIP units as shown in FIG. 11. In addition, the ADIP units include signals modulated by both the MSK modulation technique and the STW modulation technique.

Fifty six wobble sections in a single ADIP unit are prescribed as follows.

Wobble numbers 0 to 5: sync mark using MSK
Wobble numbers 12 to 19: data mark A using MSK
Wobble numbers 22 to 29: data mark B using MSK The sync mark is assigned to all ADIP units as common data. Specifically, two MSK marks are placed in six wobble sections.

The monotone unit contains data of a non-modulated wobble fundamental wave (monotone) in addition to the sync mark.

The reference units STW+ and STW− respectively have the following data structure in addition to the sync mark.

Reference unit STW+: STWs representing 1 are placed to wobble numbers 32 to 51.
Reference unit STW−: STWs representing 0 are placed to wobble numbers 32 to 51.

The sync units 0 to 3 are distinguishable according to the arrangement of the MSK in data mark A and data mark B.

Data 0 unit and data 1 unit are prescribed by STW placed at data mark A in addition to the sync mark as shown below.

Data 0 unit: MSK mark is placed to wobble numbers 12 to 14.
Data 1 unit: MSK mark is placed to wobble numbers 17 to 19.

When data is recorded in only a groove as has been done on media in a BD format in the past, address information is recorded with the aforementioned data. When data is also recorded in a land in addition to the groove in order to increase recording density, address information is recorded with data with out-of-phase STWs to enable reproduction of addresses on the land. Specifically, a data 0 (STW+) unit with STWs representing 1 placed to wobble numbers 32 to 51 and a data 0 (STW−) unit with STWs representing 0 placed to wobble numbers 32 to 51 are prescribed as data 0 units. Also, a data 1 (STW+) unit with STWs representing 1 placed to wobble numbers 32 to 51 and a data 1 (STW−) unit with STWs representing 0 placed to wobble numbers 32 to 51 are prescribed as data 1 units. Irrespective of the presence or absence of STWs in the area from wobble numbers 32 to 51, the data 0 units and data 1 units have a common STW structure, respectively, in the data mark A.

Figure 12A:
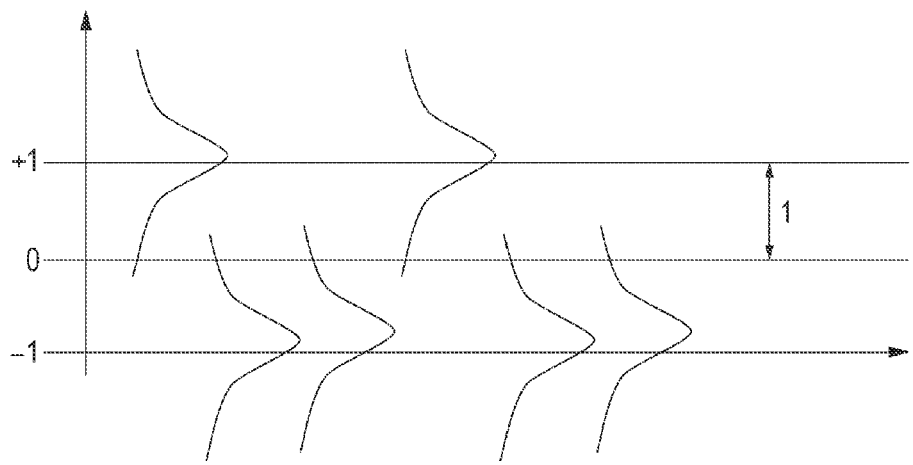
FIGS. 12A and 12B are schematic diagrams to illustrate the second embodiment of the present disclosure.

In an example of MSK demodulation methods, the MSK mark is firstly multiplied by a wobble fundamental wave with a wobble frequency of two cycles, and the multiplication result is integrated. The results of the two cycles, an even-numbered cycle and an odd-numbered cycle, are normalized to obtain {+1, −1, −1}. In the monotone area, a positive value of +1 or higher is constantly generated. Since the MSK is to detect two values, +1 or −1, the threshold used in MSK is 1 as shown in FIG. 12A.

On the other hand, the pattern of the sync marks in the second embodiment according to the present disclosure is at least a minimum distance of 8 away from the other pattern. The metric is calculated by an equation as shown below. If the result is smaller than ($2^2$×4=16/2=8), it is determined to be a sync mark.

$$L_{sync}=(y_0-1)^2+(y_1-(-1))^2+(y_2-(-1))^2+(y_3-1)^2+(y_4-(-1))^2+(y_5-(-1))^2<16/2=8$$

For example, a monotone composed of a wobble fundamental wave is represented as {+1, +1, +1, +1, +1, +1}. The square distance from the sync mark of the monotone is $(1-1)^2+(1-(-1))^2+(1-(-1))^2+(1-1)^2+(1-(-1))^2+(1-(-1))^2=16$. As a result, the monotone is not determined to be a sync mark. This is an example of the minimum distance.

Figure 12B:
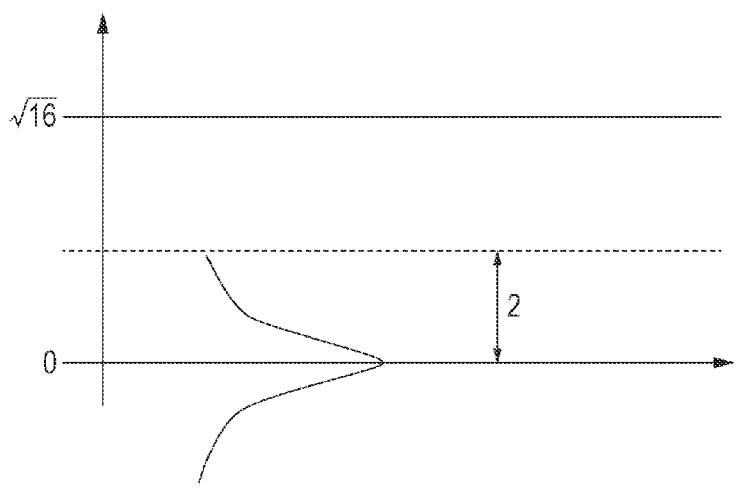

In a related detection method, the sync mark is determined based on the variance of noise with respect to a threshold of 1. In the second embodiment according to the present disclosure, the metric is calculated and then the sync mark is determined based on the variance of noise with respect to ($\sqrt{16}/2=\sqrt{2}$) as shown in FIG. 12B. Therefore, the detection method of the second embodiment is more robust to noise than the related one by 6 dB.

As described above, processing to detect a data mark is performed after detection of the sync mark. The sync mark could be compared with all patterns; however, since detection of the data mark is performed after detection of the sync mark, the wobble number of the data mark in the ADIP unit is already identified. Specifically, as with the case of the first embodiment, data mark A and data mark B are detected in wobble numbers 12 to 19 and wobble numbers 22 to 29, respectively. $r_{mw}(>1)$ is an integral value of a wobble fundamental wave. During detection of the data mark, the minimum square distance of 8 is ensured between the data marks. The threshold in this case is 8/2=4, and the data mark can be detected by the following equations.

$$L_{data0}=(y_0-1)+(y_1-(-1))^2+(y_2-(-1))^2+(y_5-r_{mw})^2(y_6-r_{mw})^2+(y_7-r_{mw})^2<8/2=4$$

$$L_{data1}=(y_0-r_{mw})+(y_1-r_{mw})^2+(y_2-r_{mw})^2+(y_5-1)^2(y_6-(-1))^2+(y_7-1)^2<8/2=4$$

If $L_{data0}$ of the above equation is detected, the data mark is determined to be data 0. If $L_{data0}$ is not detected, it is determined whether $L_{data1}$ of the above equation is detected, and if $L_{data1}$ is detected, the data mark is determined to be data 1. If both $L_{data0}$ and $L_{data1}$ are not detected, it is determined to be a wobble fundamental wave.

<4. Modification>

In the description heretofore, embodiments of the present disclosure have been specifically described, but the present disclosure is not limited to the above-described embodiments and various modifications are possible on the basis of the technical idea of the present disclosure. For example, the configurations, methods, steps, shapes, materials, and numerical values described in the above-described embodiments are merely exemplary and configurations, methods, steps, shapes, materials, and numerical values different from these may be used if necessary. The sync mark is not limited to the one placed in wobble sections with sequential eight wobble numbers, but various modifications can be made. For example, the other kinds of wobble numbers can be used and a fundamental wobble wave can be inserted between the wobble sections. Even when the MSK mark is used as a sync mark, different numbers can be assigned to the MSK marks.

The present disclosure can be also configured as follows.

[1] An information recording medium with an information track formed thereon in a shape of concentric circles or in a spiral shape, wherein a continuously-wobbling groove in which information is recorded is formed in advance, the information is delimited by a predetermined number of wobble sections, a sync mark is placed in a plurality of wobble sections in the vicinity of a delimiter of the predetermined number of wobble sections, and the sync mark is spaced apart from data other than the sync mark at a distance.

[2] The information recording medium recited in [1], wherein the predetermined number of wobble sections include a data mark representing digital data, and the data mark is spaced apart from data other than the data mark at a distance.

[3] The information recording medium recited in any of [1] and [2], wherein the distance is obtained using the sum of the square of difference between data.

[4] The information recording medium recited in any of [1], [2] and [3], wherein when the distance is smaller than a threshold, the sync mark is detected.

[5] The information recording medium recited in any of [1], [2], [3] and [4], wherein the sync mark is a signal modulated by an STW modulation method and is placed in a plurality of wobble sections.

[6] The information recording medium recited in [5], wherein the predetermined number of wobble sections include a data mark representing digital data, and the data mark is spaced apart from data other than the data mark at a distance, and the data mark is a signal modulated by an STW modulation method and is placed in a plurality of wobble sections.

[7] The information recording medium recited in any of [1], [2], [3] and [4], wherein the sync mark is a signal modulated by an MSK modulation method and is placed in a plurality of wobble sections.

[8] The information recording medium recited in [7], wherein the predetermined number of wobble sections include a data mark representing digital data, and the data mark is spaced apart from data other than the data mark at a distance, and the data mark is a signal modulated by an MSK modulation method and is placed in a plurality of wobble sections.

[9] The information recording medium recited in any of [1], [2], [3], [4], [5], and [7], wherein information is recorded in the groove and a land adjacent to the groove.

[10] An information reproducing method for reproducing information from an information recording medium with an information track formed thereon in a shape of concentric circles or in a spiral shape, wherein a continuously-wobbling groove in which information is recorded is formed in advance, the information is delimited by a predetermined number of wobble sections, and a sync mark is placed in a plurality of wobble sections in the vicinity of a delimiter of the predetermined number of wobble sections, the method including: holding data in the plurality of wobble sections associated with the sync mark; determining a distance between a pattern of the held data and a pattern of the sync mark, and comparing the distance with a threshold to detect the sync mark.

[11] An information reproducing apparatus for reproducing information from an information recording medium with an information track formed thereon in a shape of concentric circles or in a spiral shape, wherein a continuously-wobbling groove in which information is recorded is formed in advance, the information is delimited by a predetermined number of wobble sections, and a sync mark is placed in a plurality of wobble sections in the vicinity of a delimiter of the predetermined number of wobble sections, the method including: a holding unit that holds data in the plurality of wobble sections associated with the sync mark; a calculation unit that determines a distance between a pattern of the data held in the holding unit and a pattern of the sync mark; and a comparison unit that compares the distance with a threshold to detect the sync mark based on the comparison result obtained by the comparison unit.

What is claimed is:

1. An information recording medium with an information track formed thereon in a shape of concentric circles or in a spiral shape, wherein
a continuously-wobbling groove in which information is recorded is formed in advance,
the information is delimited by a predetermined number of wobble sections,
a sync mark is placed in a plurality of wobble sections in the vicinity of a delimiter of the predetermined number of wobble sections,
the sync mark is spaced apart from data other than the sync mark at a distance, and
the distance is obtained using a sum of squares of differences between data values.

2. The information recording medium according to claim 1, wherein
the predetermined number of wobble sections include a data mark representing digital data, and
the data mark is spaced apart from data other than the data mark at a distance.

3. The information recording medium according to claim 1, wherein when the distance is smaller than a threshold, the sync mark is detected.

4. The information recording medium according to claim 1, wherein the sync mark is a signal modulated by an STW modulation method and is placed in a plurality of wobble sections.

5. The information recording medium according to claim 4, wherein
the predetermined number of wobble sections include a data mark representing digital data, and
the data mark is spaced apart from data other than the data mark at a distance, and
the data mark is a signal modulated by an STW modulation method and is placed in a plurality of wobble sections.

6. The information recording medium according to claim 1, wherein
the sync mark is a signal modulated by an MSK modulation method and is placed in a plurality of wobble sections.

7. The information recording medium according to claim 6, wherein
the predetermined number of wobble sections include a data mark representing digital data, and the data mark is spaced apart from data other than the data mark at a distance, and the data mark is a signal modulated by an MSK modulation method and is placed in a plurality of wobble sections.

8. The information recording medium according to claim 1, wherein information is recorded in the groove and a land adjacent to the groove.

9. An information reproducing method for reproducing information from an information recording medium with an information track formed thereon in a shape of concentric circles or in a spiral shape, wherein a continuously-wobbling groove in which information is recorded is formed in advance, the information is delimited by a predetermined number of wobble sections, and a sync mark is placed in a plurality of wobble sections in the vicinity of a delimiter of the predetermined number of wobble sections, the method comprising:

holding data in the plurality of wobble sections associated with the sync mark;

determining a distance between a pattern of the held data and a pattern of the sync mark; and comparing the distance with a threshold to detect the sync mark.

10. An information reproducing apparatus for reproducing information from an information recording medium with an information track formed thereon in a shape of concentric circles or in a spiral shape, wherein a continuously-wobbling groove in which information is recorded is formed in advance, the information is delimited by a predetermined number of wobble sections, and a sync mark is placed in a plurality of wobble sections in the vicinity of a delimiter of the predetermined number of wobble sections, the apparatus comprising:

a holding unit that holds data in the plurality of wobble sections associated with the sync mark;

a calculation unit that determines a distance between a pattern of the data held in the holding unit and a pattern of the sync mark; and a comparison unit that compares the distance with a threshold to detect the sync mark based on the comparison result obtained by the comparison unit.

* * * * *